(12) United States Patent
Jones et al.

(10) Patent No.: US 10,643,176 B2
(45) Date of Patent: May 5, 2020

(54) METHODS AND SYSTEMS FOR UPDATING PERPETUAL INVENTORY AT RETAIL SALES FACILITIES

(71) Applicant: Walmart Apollo, LLC, Bentonville, AR (US)

(72) Inventors: Matthew A. Jones, Bentonville, AR (US); Nicholaus A. Jones, Fayetteville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 414 days.

(21) Appl. No.: 15/366,701

(22) Filed: Dec. 1, 2016

(65) Prior Publication Data

US 2017/0161674 A1 Jun. 8, 2017

Related U.S. Application Data

(60) Provisional application No. 62/262,186, filed on Dec. 2, 2015.

(51) Int. Cl.
*G06Q 10/08* (2012.01)

(52) U.S. Cl.
CPC .................. *G06Q 10/087* (2013.01)

(58) Field of Classification Search
None
See application file for complete search history.

(56) References Cited

U.S. PATENT DOCUMENTS

| | | |
|---|---|---|
| 6,249,774 B1 | 6/2001 | Roden |
| 6,681,990 B2 * | 1/2004 | Vogler .................. G06Q 10/08 235/385 |
| 6,920,427 B2 | 7/2005 | Anthony |
| 7,347,361 B2 | 3/2008 | Lovett |
| 7,543,741 B2 | 6/2009 | Lovett |
| 7,725,366 B1 | 5/2010 | Franco |

(Continued)

OTHER PUBLICATIONS

"Direct Store Delivery (DSD) Inventory Management"; http://www.highjump.com/solutions/direct-store-delivery-mobility/inventory-management; Sep. 11, 2015; (1 pg.).

(Continued)

*Primary Examiner* — Asfand M Sheikh
*Assistant Examiner* — Kimberly Suzanne Bursum
(74) *Attorney, Agent, or Firm* — Fitch, Even, Tabin & Flannery, LLP

(57) ABSTRACT

In some embodiments, methods and systems of updating perpetual inventory at a retail sales facility are described. After products are delivered to a retail sales facility, an electronic inventory management device receives electronic data indicating that a product has been delivered and calculates, based on at least one factor associated with the product, a delay period from a time of delivery of the product to the retail sales facility to a time for updating the perpetual inventory of products at the retail sales facility. After the calculated delay period elapses, the electronic inventory management device updates the perpetual inventory of the products at the retail sales facility in a product inventory database associated with the retail sales facility with information associated with the product delivered to the retail sales facility.

16 Claims, 4 Drawing Sheets

(56) References Cited

U.S. PATENT DOCUMENTS

| | | | |
|---|---|---|---|
| 7,810,720 B2 | 10/2010 | Lovett | |
| 8,321,302 B2 | 11/2012 | Bauer | |
| 8,321,303 B1 | 11/2012 | Krishnamurthy | |
| 2001/0042024 A1* | 11/2001 | Rogers | G06Q 10/0637 705/26.81 |
| 2003/0126103 A1* | 7/2003 | Chen | G06Q 10/06 706/50 |
| 2006/0157147 A1* | 7/2006 | Hillam | B67D 7/222 141/198 |
| 2008/0052205 A1* | 2/2008 | Dolley | G06Q 10/06 705/28 |
| 2010/0049635 A1* | 2/2010 | Delaney | G06Q 10/087 705/28 |

OTHER PUBLICATIONS

Ingersoll, RPh, PharmD, Katie; "Chapter 6: Inventory Management for the Pharmacy Technician"; PharmacyTechEliteCME.com; Jun. 1, 2015; pp. 53-66.

* cited by examiner

METHODS AND SYSTEMS FOR UPDATING PERPETUAL INVENTORY AT RETAIL SALES FACILITIES

RELATED APPLICATIONS

This application claims the benefit of U.S. Provisional Application No. 62/262,186, filed Dec. 2, 2015, which is incorporated herein by reference in its entirety.

TECHNICAL FIELD

This disclosure relates generally to managing inventory at a retail sales facility and, in particular, to systems and methods for updating perpetual inventory at a retail sales facility.

BACKGROUND

Retail sales facilities such as large department stores typically receive products by way of delivery via trucks during predetermined delivery time windows. Inventory management systems of such retail sales facilities generally update the perpetual inventory in their inventory management database based on the time of delivery. Such updates are made on an assumption that the products are delivered within the scheduled time window and that the products are binned and worked to the sales floor immediately or shortly after the products are delivered.

A problem with updating perpetual inventory based on such assumptions is that deliveries are not always made within the estimated delivery windows, and that the products are not always unloaded off the truck right away after being delivered the retail sales facility. For example, in some situations, unloading crews may not always be available to unload products from a delivery truck when the delivery truck arrives later or earlier than scheduled. In addition, the products do not always get binned or worked to the sales floor immediately after being taken off the delivery truck, and may be stored in the product receiving area and/or in the stock room until the workers are available to sort and scan the products.

A result of the above shortcomings of the conventional perpetual inventory updating methods is that some products may be indicated as being on-hand and available at the retail sales facility in the inventory management system, but may not be in the bins in the stock room or on the shelves of the sales floor. Such lack of precision with respect to the on-hand inventory in the inventory management system of the retail sales facility may lead to various inefficiencies including extended worker time spent trying to locate products at the retail sales facility and/or relying on availability of products that may not yet be available. Such inefficiencies are likely to increase the costs associated with product sorting at the retail sales facility and decrease the productivity of the workers at the retail sales facility.

BRIEF DESCRIPTION OF THE DRAWINGS

Disclosed herein are embodiments of systems, devices, and methods pertaining to methods and systems for updating perpetual inventory at a retail sales facility. This description includes drawings, wherein.

Figure 1:
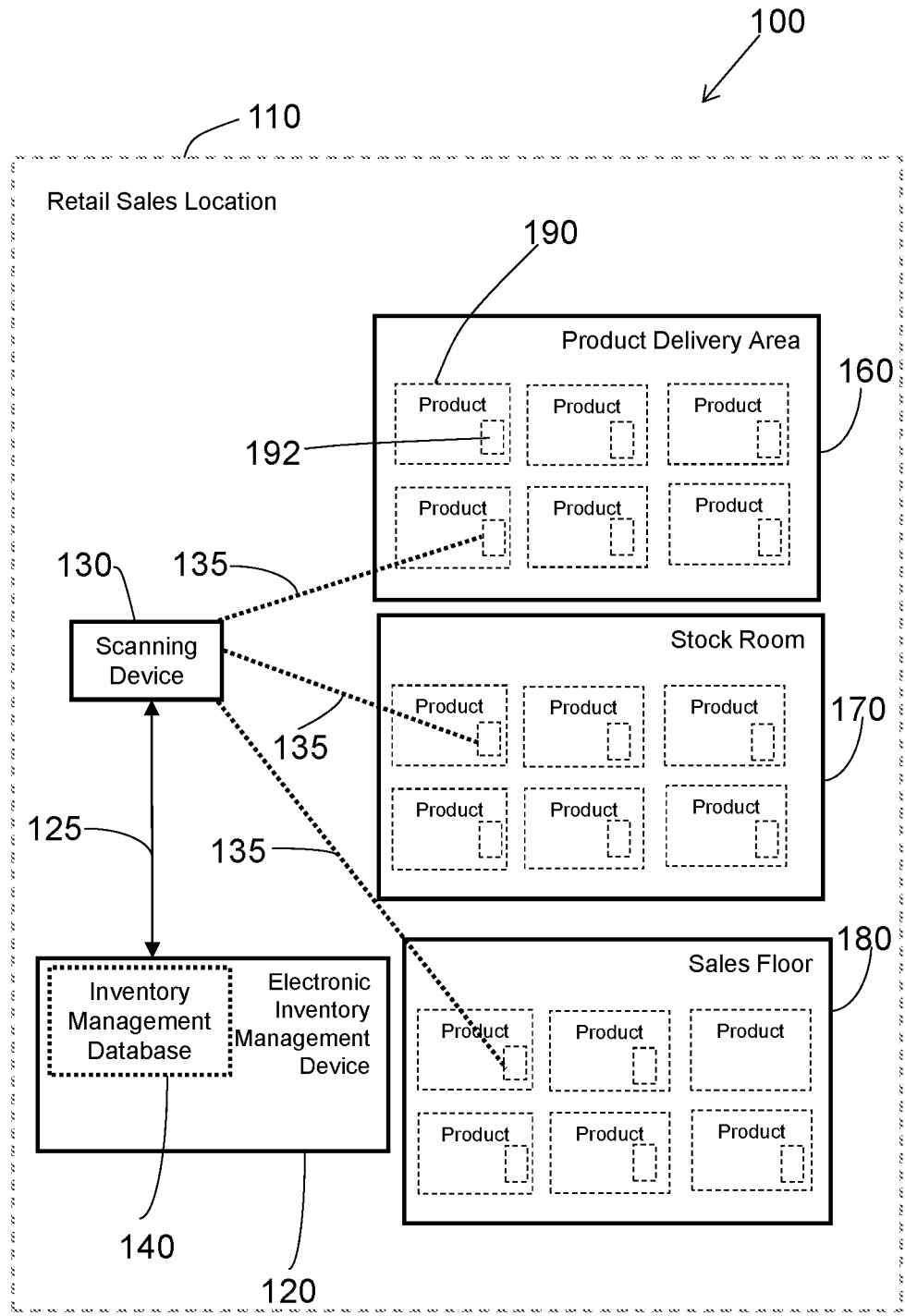
FIG. 1 is a diagram of a system for updating perpetual inventory at a retail sales facility in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, this application describes systems and methods of updating perpetual inventory at a retail sales facility. After products are delivered to a retail sales facility, an electronic inventory management device receives electronic data indicating that a product has been delivered and calculates, based on at least one factor associated with the product, a delay period from a time of actual delivery of the product to the retail sales facility to a time for updating the perpetual inventory at the retail sales facility. After the calculated delay period elapses, the electronic inventory management device updates the perpetual inventory of the products at the retail sales facility in a product inventory database associated with the retail sales facility with information associated with the product delivered to the retail sales facility.

In one embodiment, a method of updating perpetual inventory of products at a retail sales facility includes: receiving, at an electronic inventory management device including a processor at the retail sales facility, electronic data indicating that at least one product has been delivered to the retail sales facility; calculating, via the electronic inventory management device and based on at least one factor associated with the at least one product, a delay period from a time of delivery of the at least one product to the retail sales facility to a time for updating the perpetual inventory of products at the retail sales facility; and updating, via the electronic inventory management device, the perpetual inventory of the products at the retail sales facility in a product inventory database associated with the retail sales facility, with information associated with the at least one product delivered to the retail sales facility after the calculated delay period elapses.

In another embodiment, a system for updating perpetual inventory of products at a retail sales facility includes an electronic inventory management device including a processor-based control unit configured to: receive electronic data indicating that at least one product has been delivered to the retail sales facility; calculate, based on at least one factor associated with the at least one product, a delay period from a time of delivery of the at least one product to the retail sales facility to a time for updating the perpetual inventory of products at the retail sales facility; and update the perpetual inventory of the products at the retail sales facility in a product inventory database for the retail sales facility, with information associated with the at least one product delivered to the retail sales facility after the calculated delay period elapses.

In yet another embodiments, a system of for updating perpetual inventory of products at a retail sales facility includes: means for receiving electronic data indicating that at least one product has been delivered to the retail sales facility; means for calculating, based on at least one factor associated with the at least one product, a delay period from a time of delivery of the at least one product to the retail sales facility to a time for updating the perpetual inventory of products at the retail sales facility; and means for updating the perpetual inventory of the products at the retail sales facility in a product inventory database for the retail sales facility with information associated with the at least one product delivered to the retail sales facility after the calculated delay period elapses.

FIG. 1 shows an embodiment of a system 100 for updating perpetual inventory of products 190 at a retail sales facility 110. The retail sales facility 110 may be any place of business (e.g., a brick-and-mortar store) where products 190 are stocked and sold to consumers. The term "perpetual inventory" refers to the continuous and/or periodic monitoring of the products 190 on-hand at the retail sales facility 110. The products 190 on-hand at the retail sales facility may include, but are not limited to: products recently delivered to the retail sales facility 110 and still in a product delivery area 160, "overstock" products stored in a stock room 170 of a retail sales facility 110, and products 190 on a sales floor 180 of the retail sales facility 110. It will be appreciated that while the product delivery area 160, stock room 170, and sales floor 180 are being shown in FIG. 1 to each contain six products 190 for ease of illustration, it will be appreciated that the product delivery area 160, stock room 170, and sales floor 180 may store hundreds or thousands of products 190. Further, while FIG. 1 does not show storage bins in the stock room 170 for ease of illustration, it will be appreciated that at least some of the products 190 stored in the stock room 170 are stored in storage bins (i.e., "binned").

The exemplary system 100 in FIG. 1 includes an electronic inventory management device 120 configured generally to manage the inventory of products 190 at the retail sales facility 110, and more specifically, to store and manage electronic data associated with the products 190 on-hand and/or sold at the retail sales facility 110, as well as worker tasks (i.e., action to be taken by a worker) with respect to the products 190 at the retail sales facility 110. The electronic inventory management device 120 in FIG. 1 may be a stationary or portable electronic device including a processor-based control unit, for example, a desktop computer, a laptop computer, a tablet, a mobile phone, or any other electronic device configured for data entry and one-way and/or two-way communication (e.g., via communication channel 125) with another device that is located at the retail sales facility 110 (e.g., scanning device 130), or that is located remote to the retail sales facility 110 (e.g., a regional server configured for two-way communication with electronic inventory management devices 120 at several retail sales facilities 110).

With reference to FIG. 1, the exemplary electronic inventory management device 120 includes a product inventory database/inventory management database 140 configured to store electronic information regarding the products 190 at the retail sales facility 110 and the worker tasks scheduled or performed by the workers with respect to the products 190. In some embodiments, the inventory management database 140 may store electronic data including but not limited to: window of time projected for delivery of products 190 to the retail sales facility; presence of scheduled picks for products 190 still on delivery truck but not yet performed; indication that a product 190 is a cold chain item requiring refrigeration; indication that a product 190 has an expiration date; an indication that a unique (e.g., secondary) barcode is scanned; indication that a product 190 is a direct-to-bin, direct-to-sales floor, new, and/or feature product; indication of binning of a product 190 or picking of a product 190 in the stock room 170; and indication of opening of a door to a cargo area of a delivery truck. The inventory management database 140 may be stored, for example, on non-volatile storage media (e.g., a hard drive, flash drive, or removable optical disk) internal or external relative to the electronic inventory management device 120, or internal or external to computing devices separate from the electronic inventory management device 120.

The above-described exemplary electronic data and other electronic data associated with the products 190 and worker tasks at the retail sales facility 110 may be recorded in the inventory management database 140, for example, as a result of a worker at a retail sales facility 110 scanning the products 190 using the scanning device 130. The worker may scan a product 190, for example, when retrieving the product 190 from the cargo space of the delivery truck during product unloading, when binning the product 190 into a bin in the stock room 170, when picking the product 190 from the bin in the stock room 170, and/or when placing the product 190 onto a shelf or another display area on the sales floor 180. In some embodiments, at least some of the electronic data stored in the inventory management database 140 may be transmitted to the electronic inventory management device 120 from a remote (e.g., regional) server. By way of example, electronic data reflecting the storage requirements and/or expiration date and/or other factors associated with the product 190 may be received by the electronic inventory management device 120 from a server located at a product distribution or at a regional data center.

In the embodiment shown in FIG. 1, the system 100 includes a scanning device 130 in two-way communication with the electronic inventory management device 120 over a communication channel 125 (which may be a wired or wireless channel). The scanning device 130 may be an electronic (e.g., hand-held) scanner that may be used by a worker at the retail sales facility 110. Examples of such scanning devices 130 may include, but are not limited to barcode readers, RFID readers, SKU readers, electronic tablets, cellular phones, or the like mobile electronic devices. Alternatively, the scanning device 130 may be a stationary electronic scanning device installed in the product delivery area 160 and/or stock room 170 of the retail sales facility 110. In the embodiment illustrated in FIG. 1, the scanning device 130 may obtain electronic data associated with the scanned product 190 by communicating via a communication channel 135 (e.g., radio waves) with a unique identifying indicia 192 (e.g., barcode, radio frequency identification (RFID), or stock keeping unit number (SKU) on an exterior of the product 190.

After the product 190 is delivered to the retail sales facility on a delivery truck and the workers open the doors to the cargo space of the delivery truck and unload and scan the product 190 via the scanning device 130 as described above, the electronic inventory management device 120 may receive electronic data associated with the product 190 (e.g., unique identification of the product 190) from the scanning device 130 by way of the two-way communication channel 125. For example, when a worker unloads a product 190 from a delivery truck in the product delivery area 160 of the retail sales facility 110, the worker may use the scanning device 130 to scan the unique identifier 192 on the product 190, in response to which electronic data uniquely identifying the product 190 is obtained by the scanning device 130. Also, as the worker initially scans the product 190 after unloading the product 190 from the delivery truck, data identifying the worker task performed by the worker (i.e., product unload) with respect to the product 190 may be transmitted by the scanning device 130 to the electronic inventory management device 120 and recorded in the inventory management database 140.

Figure 2:
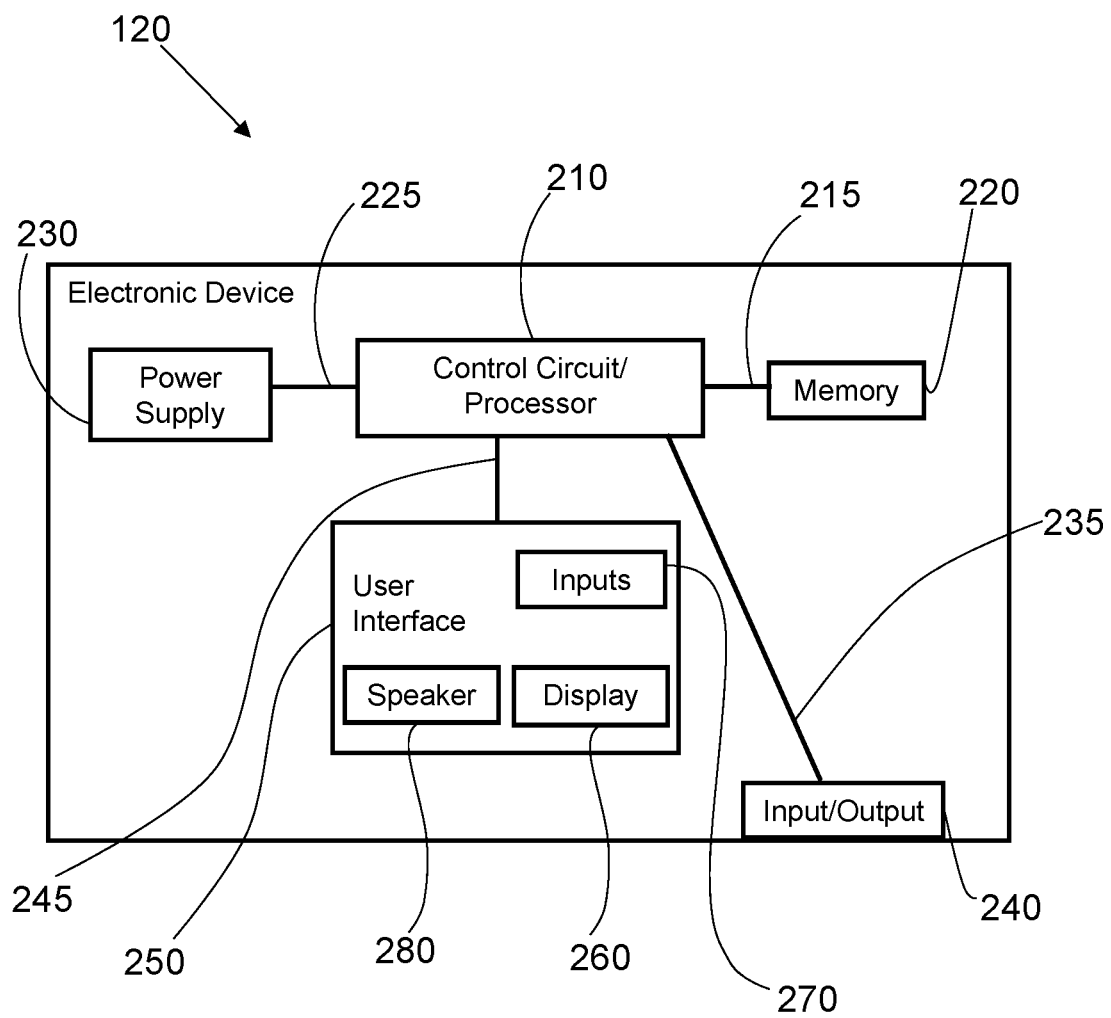
FIG. 2 is a functional block diagram of an electronic inventory management device in accordance with some embodiments.

An exemplary electronic inventory management device 120 depicted in FIG. 2 is a computer-based device and includes a control circuit (i.e., control unit) 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, an application specification integrated circuit, a field programmable gate array, and so on. These architectural options are well known and understood in the art and require no further description.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control circuit (i.e., control unit) 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM)). Accordingly, the memory 220 and/or the control unit 210 may be referred to as a non-transitory medium or non-transitory computer readable medium. The control unit 210 is also electrically coupled via a connection 235 to an input/output 240 that can receive signals from and send signals (via a wired or wireless connection) to (e.g., commands, inventory database information), for example, devices (e.g., scanning device 130) local to the retail sales facility 110, or one or more servers remote to the retail sales facility 110.

Optionally, instead of receiving information regarding the products 190 in the product delivery area 160, and/or stock room 170, and/or sales floor 180 of the retail sales facility 110 from a separate scanner such as the scanning device 130, the control unit 210 of the electronic inventory management device 120 may also be electrically coupled to a sensor such as a reader configured to detect and/or read information on the identifying indicia 192 located on the products 190 when the electronic inventory management device 120 is placed in direct proximity to a product 190 to enable the scanning of the identifying indicia 192. Such an optional reader may be a radio frequency identification (RFID) reader, an optical reader, a barcode reader, or the like.

In the embodiment shown in FIG. 2, the processor-based control unit 210 of the electronic inventory management device 120 is electrically coupled via a connection 245 to a user interface 250, which may include a visual display or display screen 260 (e.g., LED screen) and/or button input 270 that provide the user interface 250 with the ability to permit a user such as a product unloading worker, or stock room associate, or sales floor associate at the retail sales facility 110 to manually control the electronic inventory management device 120 by inputting commands, for example, via touch-screen and/or button operation or voice. The display screen 260 can also permit the user to see menus, options, worker tasks, and/or alerts displayed by the electronic inventory management device 120. The user interface 250 of the electronic inventory management device 120 may also include a speaker 280 that provides audible feedback (e.g., alerts) to the user.

Figure 3:
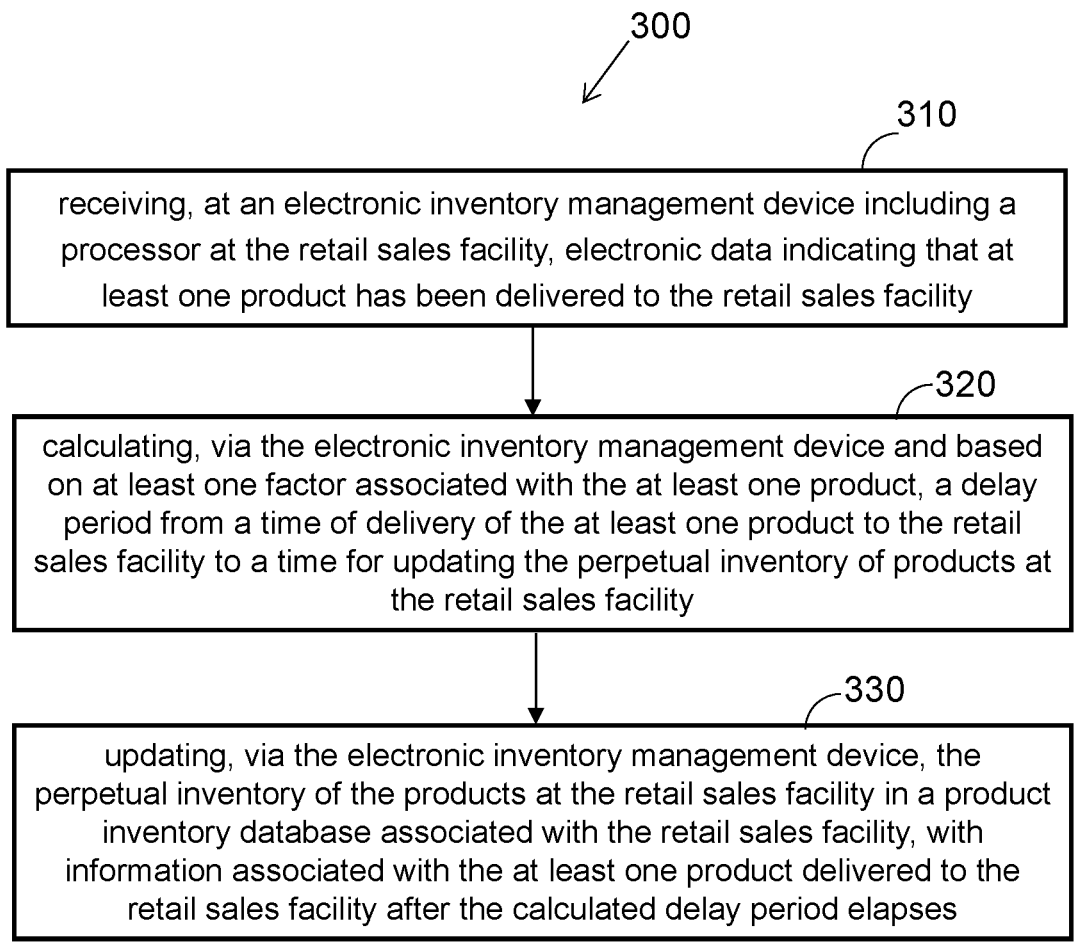
FIG. 3 is a flow diagram of a process of updating perpetual inventory at a retail sales facility in accordance with some embodiments.

With reference to FIGS. 1-3, one method 300 of operation of the system 100 for updating perpetual inventory of products 190 at a retail sales facility 110 will now be described. The method 300 is described in the context of the system of FIG. 1 by way of example only, but it will be appreciated that embodiments of the method 300 may be implemented in the system 100 or other systems.

As shown in FIG. 3, the method 300 includes receiving, at the electronic inventory management device 120, electronic data indicating that one or more products 190 has been delivered to the retail sales facility 110 (step 310). In some embodiments, the electronic data indicating that one or more products 190 has been delivered to the retail sales facility 110 is generated when a worker at the retail sales facility 110 opens the doors of the cargo space of the delivery truck and transmits electronic data (e.g., via the scanning device 130) to the electronic inventory management device 120 indicating the initiation of the unloading of the products 190 from the delivery truck.

In some embodiments, the inventory management database 140 may include data representing an electronic bill of lading including a listing of all of the products 190 delivered in the truck as well as information pertaining to the characteristics (e.g., temperature-sensitive product, product having an expiration date, direct-to-bin product, feature product, etc.) associated with each of the products 190 on the electronic bill of lading. The electronic bill of lading for each of the delivery trucks may be transmitted to the electronic inventory management device 120 for storage in the inventory management database 140 from a server remote to the retail sales facility 110, for example, a server at a product distribution center or a server of the delivery company. In some embodiments, the processor of the control unit 210 of the electronic inventory management device 120 is programmed, after receiving electronic data indicating that the delivery truck has arrived and its doors opened for unloading, to send a signal to the inventory management database 140 to retrieve the electronic bill of lading for this particular delivery truck from the inventory management database 140 and to retrieve electronic data associated with the products 190 on the bill of lading and/or one or more worker tasks performed relative to the products 190 on the bill of lading after their delivery to the retail sales facility 110.

In the embodiment of FIG. 3, the control unit 210 of the electronic inventory management device 120 is programmed to calculate based on at least one of electronic information associated with the product 190 (e.g., product characteristics such as special storage conditions, expiration date, etc. or a worker task event such as user confirmation of unload or scanning of a product after unload), a delay period from a time of actual delivery of the product 190 to the retail sales facility 110 (e.g., from the time the doors to the cargo space of the delivery truck are opened by the workers) to a time for updating the perpetual inventory at the retail sales facility 110 (step 320). The delay period from the time the products 190 are actually delivered to the retail sales facility 110 to the time when the perpetual inventory of products 190 at the retail sales facility 110 is updated depends on a variety of factors processed by the control unit 210 of the electronic inventory management device 120. In other words, the processor of the control unit 210 of the electronic inventory management device 120 is programmed to process various factors in determining whether to delay the updating of the perpetual inventory for a calculated period of time and if so, to determine an appropriate period of delay, or whether to update the perpetual inventory immediately upon actual delivery of the products 190 to the retail sales facility 110.

As will be described in more detail with reference to FIG. 4, the control unit 210 of the electronic inventory management device 120 is programmed to evaluate one or more factors in determining whether or not to delay the updating of the perpetual inventory after the doors of the delivery truck are opened in the product delivery area 160 of the retail sales facility 110, and the amount of the delay, if a delay is warranted. The factors include but are not limited to electronic information indicating: whether the product 190 requires refrigerated storage or has an expiration date; the latest confirmed task performed by the worker and entered into the system 100; window of time when the product 190 was expected to be delivered to the retail sales facility 110; whether the barcode of the product 190 represents a unique barcode indicating that the product 190 came from a specific delivery truck; whether the system-generated picks for products 190 on delivery truck have been completed or not; whether the product 190 is designated as a new, modular, feature, direct-to-bin or a direct-to-sales floor product; whether the product 190 has been binned in the stock room 170 of the retail sales facility 110; whether products having a similar category to the products 190 that were delivered are being binned in the stock room 170 or worked on the sales floor 180 of the retail sales facility 110; whether the door of the cargo space of the delivery trailer has been opened and/or a seal covering the door has been broken.

In some embodiments, the control unit 210 of the electronic inventory management device 120 is programmed to send a signal including a request for one or more factors associated with the product 190 to be retrieved either from the inventory management database 140 or from a remote inventory management database and to be transmitted to the electronic inventory management device 120 for processing by the control unit 210. As described above, some of the above-discussed factors associated with the products 190 may be retrieved by the control unit of the electronic inventory management device 120 from the inventory management database 140 (e.g., product characteristics associated with the products 190 on an electronic bill of lading stored in the inventory management database 140), while some of the factors may be entered by a worker into the system 100 via the scanning device 130 (e.g., during unloading/sorting, binning, picking, and/or displaying on sales floor) and transmitted to the electronic inventory management device 120 for storage in the inventory management database 140.

As discussed above, the inventory management database 140 may be internal to the electronic inventory management device 120, or may be stored on a remote database in wired or wireless communication with the electronic inventory management device 120. In the embodiment of FIG. 1, the above-discussed factors, which are processed by the control unit 210 in order to arrive at a decision of whether a delay in updating the perpetual inventory is warranted and the amount of the delay, are stored in (and can be retrieved by the control unit 210 from) the inventory management database 140 of the electronic inventory management device 120. It will be appreciated that one or more of such factors may be obtained by the electronic inventory management device 120 from a database server remote to the retail sales facility 110.

Referring back to the exemplary method 300 illustrated in FIG. 3, the control unit 210 of the electronic inventory management device 120 is programmed to update the perpetual inventory of the products 190 at the retail sales facility 110 in the product inventory database 140 with information associated with one or more products 190 delivered to the retail sales facility 110 after the calculated delay period elapses (step 330). The delay from the time the products are actually delivered to the retail sales facility 110 (e.g., from the time the doors to the carto space of the delivery truck are open and unloading of the delivered products 190 begins) to the time when the perpetual inventory is updated in the inventory management database 140 may be, for example, from about 1 to about 2 hours, from about 3 to about 4 hours, from about 5 to about 8 hours, from about 8 to about 12 hours, and longer than 12 hours, when appropriate, depending on the actual time of delivery and unloading crew availability.

In some embodiments, in response to a determination by the control unit 210 that one or more of the above-discussed factors supports updating the perpetual inventory without setting a delay period following actual delivery of the products 190 to the retail sales facility, the control unit 210 may generate a signal to the inventory management database 140 to update the perpetual inventory with the products 190 immediately. Conversely, in response to a determination by the control unit 210 that one or more of the above-discussed factors supports updating the perpetual inventory after a certain delay period following actual delivery of the products 190 to the retail sales facility 110, the control unit 210 may generate a signal to the inventory management database 140 to update the perpetual inventory with the products 190 after a specified delay period determined by the control unit 210 elapses.

Figure 4:
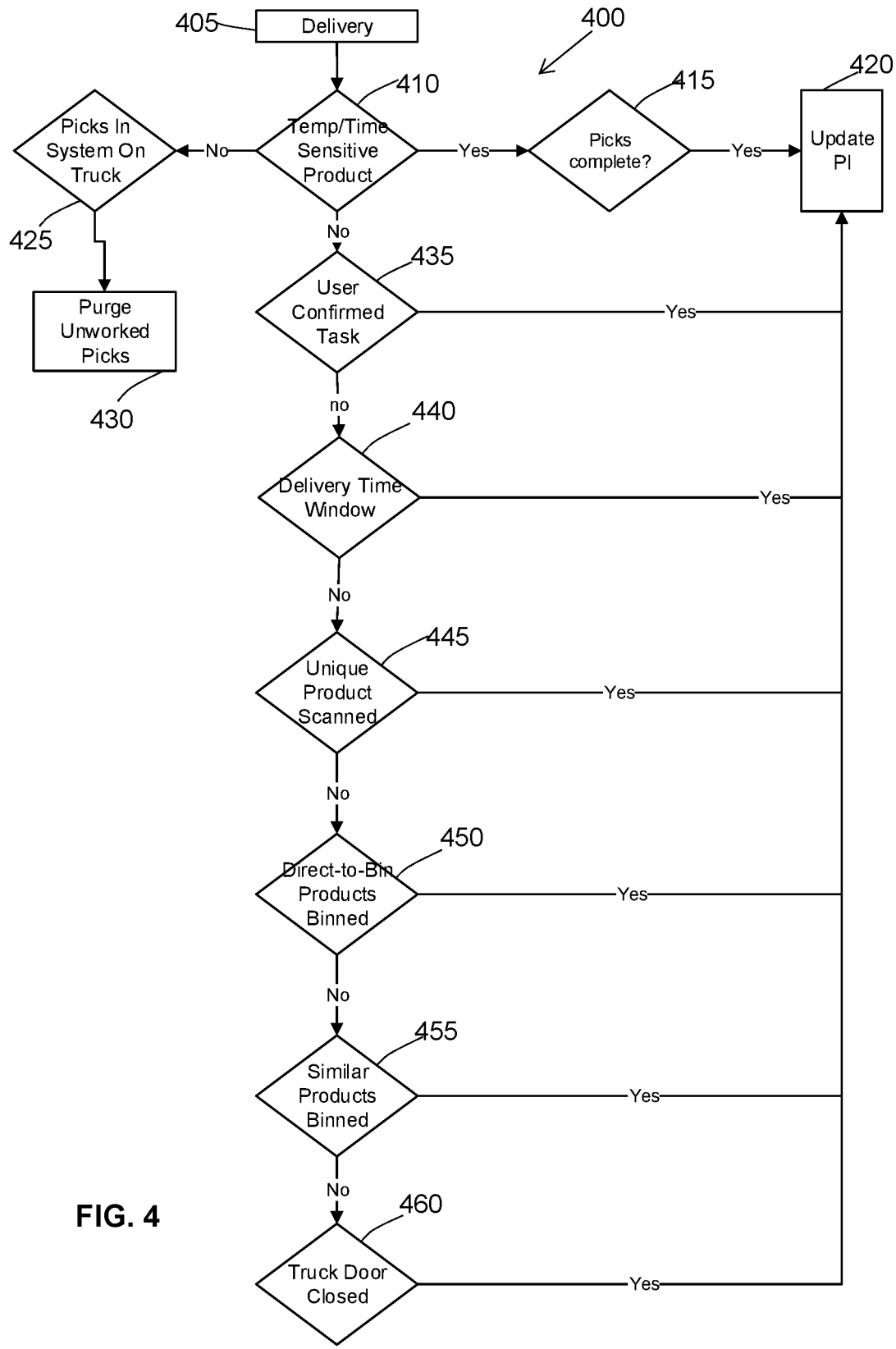
FIG. 4 is a flow diagram of a process of updating perpetual inventory at a retail sales facility in accordance with some embodiments.

FIG. 4 shows one embodiment of an operational workflow in implementing a method 400 in order to determine whether to update the electronic data in the inventory management database 140 representing the perpetual inventory of products 190 at the retail sales facility 110 and if so, a delay period determined based on the processed factors associated with the products 190. The workflow is initiated after products 190 are delivered to the retail sales facility 110 via a delivery truck and after a worker at the retail sales facility 110 opens the doors (e.g., breaking a seal placed on the doors of the trailer) to the cargo space of the delivery truck to get access to the delivered products 190 (step 405). In some embodiments, after the doors of the cargo space of the delivery truck are opened by a worker, the worker may use the scanning device 130 to make an entry indicating that the unloading was initiated, after which the scanning device 130 transmits this worker task or action performed by the worker (and entered into the scanning device 130) to the electronic inventory management device 120.

In some embodiments, after the doors of the cargo space of the delivery truck are opened, the control unit 210 of the electronic inventory management device 120, is programmed to set a delay for updating the perpetual inventory based on how many workers are available at the product delivery area 160 to unload the products 190 from the delivery truck. For example, the control unit 210 of the electronic inventory management device 120 may be programmed to analyze the number of clocked in workers and the amount of time the clocked in workers still have until the end of their scheduled shift and, based on that information, to estimate an amount of time that the available workers will require to unload the products 190 from the delivery truck, and to set a period of delay for updating the perpetual inventory accordingly.

In the embodiment of FIG. 4, the processor of the control unit 210 of the electronic inventory management device 120 is programed to determine whether the scanned product 190 is a cold chain product that requires refrigeration in order to keep the product fresh (410). Examples of cold chain products include but are not limited to meat products, dairy products, seafood products, or the like. When electronic data obtained by the control unit 210 of the electronic inventory management device 120 from the inventory management database 140 (or a remote central server that stores product information) indicates that the product 190 is a cold chain product, the control unit 210 of the electronic inventory management device 120 is programed to determine whether picks of the cold chain product 190 from the delivery truck are complete (step 415). In some embodiments, to make this determination, the control unit 210 queries the inventory management database 140, where electronic data reflecting all picks recorded at the retail sales facility 110 is stored.

If the electronic data retrieved from the inventory management database 140 indicates that the picks of the cold chain product 190 off the delivery truck were complete, the control unit 210 is programmed to send a signal to the inventory management database to update the perpetual inventory (step 420). In some embodiments, for products 190 that are determined to be cold chain, the control unit 210 is programmed to generate a shortened delay for updating perpetual inventory than for non-cold chain product, based on an assumption that workers that unload products 190 off the delivery truck will unload cold chain products 190 off the delivery truck quicker than they would unload non-cold chain products 190. For example, in some embodiments, for time-sensitive and temperature sensitive products 190, the control unit 210 is programmed to delay the update of the perpetual inventory until after the picks of the products 190 off the delivery truck are completed.

In other words, the control unit 210 is programmed to set a delay period from a time the time-sensitive or temperature sensitive product 190 is delivered to the retail sales facility 110 to a time of the completion of the pick of the at least one time-sensitive or temperature-sensitive product 190. In some embodiments, for products 190 that are indicated to have an expiration date (e.g., on the electronic bill of lading stored in the inventory management database 140), the control unit 210 is programmed to set a delay for updating perpetual inventory until the expiration date is entered into the system 100 by a worker via the scanning device 130, and then to update the perpetual inventory for the products 190 on the delivery truck upon a determination that the expiration date for the product 190 entered by the worker matches the expiration date for the product 190 stored in the inventory management database 140.

If in step 410, the data obtained from the inventory management database 140 (or a remote server that stores product information) indicates that the product 190 is a not a cold chain product (i.e., a time-sensitive/temperature-sensitive product), the control unit 210 of the electronic inventory management device 120 is programed to query the inventory management database 140 to determine whether the inventory management database 140 includes generated but unworked picks for the product 190 from the delivery truck (step 425). If the query of the inventory management database 140 indicates that the inventory management database 140 includes generated but unworked picks for the product 190, the control unit 210 is programmed to purge the unworked picks for the products 190 from the inventory management database 140 (step 430).

In other words, upon a determination by the control unit 210 that a product 190 that is not time-sensitive or temperature-sensitive is on a pick list, the control unit 210 is programmed to remove such a product from the pick list. Also, as discussed above, for products 190 that are determined to be not cold chain, the control unit 210 is programmed to generate a longer delay for updating perpetual inventory than for cold chain product, based on an assumption that workers that unload products 190 off the delivery truck will unload non-cold chain products 190 off the delivery truck after they unload cold chain products 190.

As shown in FIG. 4, the processor of the control unit 210 of the electronic inventory management device 120 is programed to determine whether electronic data indicating user confirmation of a performed task is physically entered by the worker using the scanning device 130 (step 435). As discussed above, the control unit 210 of the electronic inventory management device 120 is programed to query the inventory management database 140 and, if the electronic data retrieved from the inventory management database 140 in response to the query indicates that a worker task related to the products 190 delivered on the truck (e.g., "unloading of delivered products 190 complete" or "sorting of delivered products 190 complete") was physically confirmed by the worker (e.g., using the scanning device 130), the control unit 210 is programmed to send a signal to the inventory management database 140 to update the perpetual inventory (step 420).

For example, when a product 190 is not a time-sensitive or a temperature-sensitive product 190, the control unit 210 is programmed to set a delay period from a time the product 190 is delivered to the retail sales facility 110 to a time when the product was confirmed by the worker to be picked from the bin in the stock room 170, and then to update the perpetual inventory upon receiving a transmission from the scanning device 130 indicating that the product 190 was picked from a bin in the stock room 170. This is based on an assumption that a product 190 that was delivered on a truck was picked from a bin in the stock room 170 had to be unloaded from the delivery truck in order to be binned in the stock room 170.

Referring to FIG. 4, the processor of the control unit 210 of the electronic inventory management device 120 is also programed to determine whether the products 190 were delivered to the retail sales facility 110 within the expected delivery time window (step 440). Control unit 210 queries the inventory management database 140 to retrieve any electronic data indicating the projected time of delivery of the products 190 and the actual time of delivery of the products 190 to the retail sales facility 110 (e.g., receipt of an entry via the scanning device 130 indicating that the doors to the cargo space of the delivery truck were opened). If the electronic data retrieved from the inventory management database 140 indicates that a product 190 was delivered outside of the projected time for delivery, the control unit 210 is programmed to send a signal to the inventory management database 140 to delay the updating of the perpetual inventory or to update the perpetual inventory (step 420) as appropriate.

In other words, the control unit 210 may be programmed to calculate the delay period for updating the perpetual inventory based on a comparison of the time period of projected delivery of the product 190 to the retail sales facility and the time of actual delivery of the product 190 to the retail sales facility 110. In some embodiments, for deliveries outside of expected delivery window, the control unit 210 may be programmed to update the perpetual inventory with a predetermined delay for early deliveries and, based on the amount of delay, to update perpetual inventory either immediately or at a later time as appropriate. For example, when a delivery truck is expected to deliver products 190 to the retail sales facility 110 from 2 pm to 3 pm on a given day, but the delivery truck arrives at 6 pm, the control unit 210 may be programmed to update the perpetual inventory on the morning of the next day, based on an assumption that the delivery truck was not unloaded by workers at the retail sales facility 110 after delivery because the unloading crew was no longer available due to the delay of the delivery truck.

In some embodiments, for products 190 delivered to the retail sales facility 110 and having a unique identifier associating the products 190 with a particular delivery, in response to detecting a unique barcode scan (step 445), the control unit 210 is programmed to send a signal to update the perpetual inventory (step 420). Such a unique barcode scan may be a scan of a barcode or another identifier (e.g., RFID) on the product 190 that associates the scanned product 190 with the delivery truck, for example. Since the bar code is unique to the scanned product 190 delivered on the truck to the retail sales facility 110, the control unit 210 is programmed to process this electronic information as a confirmation that this product 190 was one of many unloaded from the delivery truck. In other words, the control unit 210 is programmed to update the perpetual inventory in the product inventory database 140 when the product 190 having a unique identifying indicia is scanned (e.g., during binning) because the binning of the product 190 into a bin in the stock room 170 is later in the stocking process than the unloading of the product 190 off the truck. Thus, for products 190 having unique identifying indicia indicating that the products 190 were on a bill of lading for a truck delivered to the retail sales facility 110, the control unit 210 is programmed to set a delay period from a time such a product 190 is delivered to the retail sales facility 110 to a time of the scanning of the unique identifier of the product 190 at the retail sales facility 110.

In some embodiments, for products 190 delivered to the retail sales facility 110 and indicated (e.g., on an electronic bill of lading) to be direct-to-bin products, the control unit 210 is programmed to set a delay for updating perpetual inventory until receipt of a worker task event indicative of the binning of the products 190 at the stock room 170 of the retail sales facility 110. Then, in response to detecting a binning of a "direct-to-bin" product 190 (step 450), which may be electronic data representing a "binning" scan of a product 190 transmitted from the scanning device 130, the control unit 210 is programmed to update the perpetual inventory in the inventory management database 140 (step 420). Again, the control unit 210 processes electronic data representing the binning of the direct-to-bin product 190 into a bin in the stock room 170 as a confirmation that this product 190 has been unloaded from the delivery truck and worked to the stock room 170 for binning. As such, for direct-to-bin products, the control unit 210 is programmed in some embodiments to set a delay period from a time such a product 190 is delivered to the retail sales facility 110 to a time of binning of such a product in the stock room 170.

In some embodiments, in response to detecting the binning of or the picking of a product 190 having a common category or common location with the products 190 that were delivered to the retail sales facility 110 on a delivery truck (step 455), the control unit 210 is programmed to update the perpetual inventory in the inventory management database 140 (step 420) in response to receiving electronic data (e.g., from the scanning device 130) indicating that such a common-category or common-location product 190 has been worked. Again, the control unit 210 processes the binning of a product 190 at an area of the stock room 170 nearby an area where the delivered products 190 would be binned as a confirmation that this related product 190 is being worked because all of the products 190 hat came from the delivery truck have been unloaded from the delivery truck and binned in the stock room 170. As such, for products 190 at the retail sales facility 110 having a category in common with the products 190 that were indicated as having been delivered to the retail sales facility 110, the control unit 210 is programmed to set a delay period from a time the products 190 were delivered to the retail sales facility 110 to a time of binning of such a common-category product 190.

In some embodiments, in response to detecting a closing of a door of the trailer of the delivery truck (e.g., when a worker task of closing the doors of the trailer is transmitted by a worker via the scanning device 130) (step 460), the control unit 210 is programmed to update the perpetual inventory in the inventory management database 140 (step 420). Here, the control unit 210 is programmed to process the closing of the doors of the trailer of the delivery truck as a confirmation that the products 190 delivered on this truck have been received and unloaded from the truck and moved to their intended locations (e.g., stock room 170 or sales floor 180) at the retail sales facility 110. As such, in some embodiments, the control unit 210 is programmed to set a delay period from a time when the products 190 were actually delivered in a delivery truck to the retail sales facility 110 to a time when a door of a cargo area of a delivery truck and/or from a time when a loading dock door was closed at the retail sales facility 110.

While in the embodiment shown in FIG. 4, the determination of whether or not to update the perpetual inventory is based on processing seven factors (410, 435, 440, 445, 450, 455, and 460), it will be appreciated that the processor of the control unit 210 of the electronic inventory management device 120 may be programmed to generate the determination of whether or not to update the perpetual inventory based on a determination that any one, any two, any three, any four, any five, or any six of these factors are met.

The systems and methods described herein analyze one or more factors associated with the products delivered to a retail sales facility to determine whether to update perpetual inventory with a delay or without a delay after the products are actually delivered to the retail sales facility. The controlled determination of when to update the perpetual inventory relative to the time of actual delivery of the products to the retail sales facility advantageously increases the accuracy of the inventory management system with respect to indicating the on-hand inventory of products at the retail sales facility and significantly improves worker efficiency.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of updating perpetual inventory of products at a retail sales facility, the method comprising:
    scanning, via an electronic scanning device, at least one product delivered by a delivery truck to the retail sales facility to generate, via the electronic scanning device:
        electronic data associated with the at least one product and identifying the at least one product;
        electronic data indicating that the at least one product has been delivered by the delivery truck to the retail sales facility; and
        electronic data indicating completion of a worker task of unloading of the at least one product from the delivery truck;
    receiving, at an electronic inventory management device including a processor at the retail sales facility, electronic data indicating that at least one product has been delivered to the retail sales facility and unloaded from the delivery truck scanned by the electronic scanning device;
    providing a product inventory database configured to store data representing:
        perpetual inventory information associated with the products at the retail sales facility;
        the electronic data associated with the at least one product and identifying the at least one product;
        the electronic data indicating that the at least one product has been delivered by the delivery truck to the retail sales facility;
        the electronic data indicating completion of the worker task of unloading of the at least one product from the delivery truck;
        an electronic bill of lading including a listing of all of the products delivered by the delivery truck to the retail sales facility; and
        at least one factor associated with the products and specifying a product-associated condition, the at least one factor being analyzable by the processor of the electronic inventory management device to determine whether to update the perpetual inventory of the products at the retail sales facility in the product inventory database;
    receiving, at the electronic inventory management device and from at least one of the product inventory database and the electronic scanning device of a worker, the electronic data generated by the electronic scanning device and including the electronic data identifying the at least one product and the electronic data indicating that at least one product has been delivered by the delivery truck to the retail sales facility and the electronic data indicating completion of the worker task of unloading of the at least one product from the delivery truck;
    determining, via the processor of the electronic inventory management device, and in response to receipt of the electronic data indicating that at least one product has been delivered by the delivery truck to the retail sales facility and the electronic data indicating completion of the worker task of unloading of the at least one product from the delivery truck, whether the electronic data indicating completion of the worker task of unloading of the at least one product from the delivery truck matches all of the products listed in electronic bill of lading associated with the delivery truck and the retail sales facility;
    obtaining, via the electronic inventory management device and from the product inventory database, the at least one factor stored in the product inventory database in association with the at least one product scanned by the electronic scanning device;
    in response to determining, via the processor of the electronic inventory management device, that the product-associated condition specified by the at least one factor associated with the at least one product obtained from the product inventory database is met, calculating a delay period from a time of the scanning of the at least one product by the electronic scanning device at the retail sales facility to a time for updating the perpetual inventory of the products at the retail sales facility in the product inventory database to indicate that the at least one product scanned by the electronic scanning device at the retail sales facility is available for sale at the retail sales facility; and
    after a calculated delay period elapses, transmitting a signal from the electronic inventory management device to update the data representing the perpetual inventory of the products at the retail sales facility in the product inventory database to reflect that the at least one product delivered to the retail sales facility and scanned by the electronic scanning device is available for sale at the retail sales facility.

2. The method of claim 1, further comprising, receiving, at the electronic inventory management device, electronic data indicating that the at least one product delivered to the retail sales facility is a time-sensitive or a temperature-sensitive product,
    wherein the at least one factor associated with the at least one product includes electronic data indicating a completion of a pick of the at least one time-sensitive or temperature-sensitive product from a bin at a storage room location at the retail sales facility; and
    wherein the calculating the delay period step further comprises setting, via the electronic inventory management device, a delay period from a time the time-sensitive or temperature sensitive product is delivered to the retail sales facility to a time of the completion of the pick of the at least one time-sensitive or temperature-sensitive product.

3. The method of claim 2, wherein in response to the receiving, at the electronic inventory management device, of electronic data indicating that the at least one product delivered to the retail sales facility is not a time-sensitive or a temperature-sensitive product, and upon a determination, at the electronic inventory management device, that at least one or more products that are not time-sensitive and not temperature-sensitive are in a pick list, removing the non-time sensitive products and the non-temperature sensitive products from the pick list.

4. The method of claim 1, further comprising, receiving, at the electronic inventory management device, electronic data indicating that the at least one product delivered to the retail sales facility is not a time-sensitive or a temperature-sensitive product;
wherein the at least one factor associated with the at least one product includes electronic data indicating that the at least one product was picked from a bin at a storage room location at the retail sales facility; and
wherein the calculating the delay period step further comprises setting, via the electronic inventory management device, a delay period from a time the at least one product is delivered to the retail sales facility to a time when the at least one product was picked from the bin.

5. The method of claim 1, further comprising receiving, at the electronic inventory management device, electronic data indicating a time period of projected delivery of the at least one product to the retail sales facility;
wherein the at least one factor associated with the at least one product includes electronic data indicating a time of actual delivery of the at least one product to the retail sales facility; and
wherein the calculating the delay period further comprises calculating, via the electronic inventory management device and based on a comparison of the time of actual delivery and the time period of projected delivery, a delay period from the time of actual delivery to a time for updating the perpetual inventory of products at the retail sales facility.

6. The method of claim 1, wherein the electronic data associated with the at least one product and identifying the at least one product includes at least one of barcode data, image recognition data, and radio frequency identification (RFID) data.

7. The method of claim 1, further comprising, receiving, at the electronic inventory management device, electronic data indicating that the at least one product delivered to the retail sales facility is a direct-to-bin product;
wherein the at least one factor associated with the at least one product includes electronic data indicating that the at least one direct-to-bin product was placed in a bin at a storage location of the retail sales facility; and
wherein the calculating the delay period step further comprises setting, via the electronic inventory management device, a delay period from a time the at least one product is delivered to the retail sales facility to a time when the at least one product is placed into the bin at the storage location of the retail sales facility.

8. The method of claim 1, further comprising, receiving, at the electronic inventory management device, electronic data indicating binning of at least one product sharing a product category with the at least one product delivered to the retail sales facility;
wherein the at least one factor associated with the at least one product includes electronic data indicating that the at least one product sharing a product category with the at least one product delivered to the retail sales facility was binned at the retail sales facility; and
wherein the calculating the delay period step further comprises setting, via the electronic inventory management device, a delay period from a time the at least one product is delivered to the retail sales facility to a time when the at least one product sharing a product category with the at least one product delivered to the retail sales facility is binned at the retail sales facility.

9. A system for updating perpetual inventory of products at a retail sales facility, the system comprising:
an electronic scanning device configured to scan at least one product delivered by a delivery truck to the retail sales facility and generate:
electronic data associated with the at least one product and identifying the at least one product;
electronic data indicating that the at least one product has been delivered by the delivery truck to the retail sales facility; and
electronic data indicating completion of a worker task of unloading of the at least one product from the delivery truck;
an electronic inventory management device including a processor-based control unit configured to receive, from the electronic scanning device, electronic data indicating that at least one product has been delivered to the retail sales facility and unloaded from the delivery truck scanned by the electronic scanning device;
a product inventory database configured to store data representing:
perpetual inventory information associated with the products at the retail sales facility;
the electronic data associated with the at least one product and identifying the at least one product;
the electronic data indicating that the at least one product has been delivered by the delivery truck to the retail sales facility;
the electronic data indicating completion of the worker task of unloading of the at least one product from the delivery truck;
an electronic bill of lading including a listing of all of the products delivered by the delivery truck to the retail sales facility; and
at least one factor associated with the products and specifying a product-associated condition, the at least one factor being analyzable by the processor of the electronic inventory management device to determine whether to update the perpetual inventory of the products at the retail sales facility in the product inventory database;
wherein the processor-based control circuit is further configured to:
receive, from at least one of the product inventory database and the electronic scanning device of a worker, the electronic data generated by the electronic scanning device and including the electronic data identifying the at least one product and the electronic data indicating that at least one product has been delivered by the delivery truck to the retail sales facility and the electronic data indicating completion of the worker task of unloading of the at least one product from the delivery truck;
determine, in response to receipt of the electronic data indicating that at least one product has been delivered by the delivery truck to the retail sales facility and the electronic data indicating completion of the worker task of unloading of the at least one product from the delivery truck, whether the electronic data indicating completion of the worker task of unloading of the at least one product from the delivery truck matches all of the products listed in electronic bill of lading associated with the delivery truck and the retail sales facility;

obtain, from the product inventory database, the at least one factor stored in the product inventory database in association with the at least one product scanned by the electronic scanning device, in response to a determination that the product-associated condition specified by the at least one factor associated with the at least one product obtained from the product inventory database is met, calculate a delay period from a time of when the at least one product is scanned at the retail sales facility by the electronic scanning device to a time for updating the perpetual inventory of products at the retail sales facility in the product inventory database to indicate that the at least one product scanned by the electronic scanning device at the retail sales facility is available for sale at the retail sales facility; and after the calculated delay period elapses, transmit a signal to update the data representing the perpetual inventory of the products at the retail sales facility in the product inventory database to reflect that the at least one product delivered to the retail sales facility and scanned by the electronic scanning device is available for sale at the retail sales facility.

10. The system of claim 9, wherein the electronic inventory management device is configured to receive electronic data indicating that the at least one product delivered to the retail sales facility is a time-sensitive or a temperature-sensitive product;

wherein the at least one factor associated with the at least one product includes electronic data indicating a completion of a pick of the at least one time-sensitive or temperature-sensitive product from a bin at a storage room location at the retail sales facility; and wherein the control unit is further configured to set a delay period from a time the time-sensitive or temperature sensitive product is delivered to the retail sales facility to a time of the completion of the pick of the at least one time-sensitive or temperature-sensitive product.

11. The system of claim 10, wherein the control unit is configured, in response to a receipt at the receiving device, of electronic data indicating that the at least one product delivered to the retail sales facility is not a time-sensitive or a temperature-sensitive product, and upon a determination, at the electronic inventory management device, that at least one or more products that are not time-sensitive and not temperature-sensitive are in a pick list, to remove the non-time sensitive products and the non-temperature sensitive products from the pick list.

12. The system of claim 9, wherein the electronic inventory management device is configured to receive electronic data indicating that the at least one product delivered to the retail sales facility is not a time-sensitive or a temperature-sensitive product;

wherein the at least one factor associated with the at least one product includes electronic data indicating that the at least one product was picked from a bin at a storage room location at the retail sales facility; and wherein the control unit is further configured to set a delay period from a time the at least one product is delivered to the retail sales facility to a time when the at least one product was picked from the bin.

13. The system of claim 9, wherein the electronic inventory management device is configured to receive electronic data indicating a time period of projected delivery of the at least one product to the retail sales facility;

wherein the at least one factor associated with the at least one product includes electronic data indicating a time of actual delivery of the at least one product to the retail sales facility; and wherein the control unit is further configured to calculate, based on a comparison of the time of actual delivery and the time period of projected delivery, a delay period from the time of actual delivery to a time when the perpetual inventory of products at the retail sales facility is updated.

14. The system of claim 9, wherein the electronic data associated with the at least one product and identifying the at least one product includes at least one of barcode data, image recognition data, and radio frequency identification (RFID) data.

15. The system of claim 9, wherein the electronic inventory management device is configured to receive electronic data indicating that the at least one product delivered to the retail sales facility is a direct-to-bin product;

wherein the at least one factor associated with the at least one product includes electronic data indicating that the at least one direct-to-bin product was placed in a bin at a storage location of the retail sales facility; and wherein the control unit is further configured to set a delay period from a time the at least one product is delivered to the retail sales facility to a time when the at least one product is placed into the bin at the storage location of the retail sales facility.

16. The system of claim 9, wherein the electronic inventory management device is configured to receive electronic data indicating binning of at least one product sharing a product category with the at least one product delivered to the retail sales facility;

wherein the at least one factor associated with the at least one product includes electronic data indicating that the at least one product sharing a product category with the at least one product delivered to the retail sales facility was binned at the retail sales facility; and wherein the control unit is further configured to set a delay period from a time the at least one product sharing a product category with the at least one product delivered to the retail sales facility is binned at the retail sales facility.

* * * * *